United States Patent [19]

Spencer

[11] Patent Number: 5,713,032
[45] Date of Patent: Jan. 27, 1998

[54] COMPOUND DOCUMENT PROCESSING SYSTEM

[75] Inventor: Marc Douglas Spencer, Rochester, N.Y.

[73] Assignee: Eastman Kodak Company, Rochester, N.Y.

[21] Appl. No.: 582,571

[22] Filed: Jan. 3, 1996

[51] Int. Cl.$^6$ ............................................. G06F 9/40
[52] U.S. Cl. ............................................. 395/777
[58] Field of Search ................................ 395/777, 778, 395/788, 789, 776, 114

[56] References Cited

U.S. PATENT DOCUMENTS

| | | | |
|---|---|---|---|
| 4,488,258 | 12/1984 | Struger et al. | 364/147 |
| 5,487,165 | 1/1996 | Tsay et al. | 395/613 |
| 5,513,315 | 4/1996 | Tierney et al. | 395/183.13 |

*Primary Examiner*—Joseph H. Feild
*Assistant Examiner*—Sabrina Dickens
*Attorney, Agent, or Firm*—Thomas H. Close

[57] ABSTRACT

A compound document processing system includes: a print driver for generating a data file having commands and comments describing the compound document; a user interface including means for embedding document manipulation commands in the comments generated by the print driver; a document processing module for manipulating the data file; and a module manager responsive to the document manipulation commands embedded in the comments for causing the document processing module to manipulate the data file.

34 Claims, 4 Drawing Sheets

Microfiche Appendix Included
(1 Microfiche, 45 Pages)

COMPOUND DOCUMENT PROCESSING SYSTEM

MICROFICHE APPENDIX

Reference is made to a microfiche appendix which forms part of this specification which includes one sheet of microfiche containing forty-five frees.

COPYRIGHT NOTICE

The disclosure in the microfiche appendix contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to the field of document processing, and in particular to processing compound documents in a distributed network environment.

BACKGROUND OF THE INVENTION

In computer document processing applications a compound document is defined as a document having more than one element, such as text, line drawings, images, sound sequences and/or motion sequences. Under certain circumstances it becomes desirable to separately process one or more of the elements in the compound document at a time after the document has been created, for example replacing a low resolution proxy image with a high resolution image for printing. One known technique operates by replacing the image at print time but is limited to replacing proxy images. The capability to perform other operations such as color management or other complex image processing on a particular image in the compound document; transmitting, retrieving, or storing selected elements of the compound document; encapsulating the compound document (i.e. producing a single bit map of the text and image portions of the document); or font manipulation of text portions of the document would be desirable but is not provided by existing systems.

SUMMARY OF THE INVENTION

The present invention is directed to overcoming one or more of the problems set forth above. Briefly summarized, according to one aspect of the present invention, a compound document processing system includes: a print driver for generating a data file having commands and comments describing the compound document; a user interface including means for embedding document manipulation commands in the comments generated by the print driver; a document processing module for manipulating the data file; and a module manager responsive to the document manipulation commands embedded in the comments for causing the document processing module to manipulate the data file.

In a preferred embodiment, the compound document processing system includes a PostScript print driver for generating a data file of PostScript commands and comments describing the compound document; a Postscript user interface including means for embedding document manipulation commands in PostScript comments generated by the print driver; a document processing module for manipulating the data file, and a module manager responsive to the document manipulation commands in the PostScript comments for causing the document processing module to manipulate the data file.

The invention has the advantage of being very versatile since the system requires no a priori knowledge of the processing steps to be performed by the modules. The present invention also has the advantage that the document manipulation commands inserted into the data file do not have to be removed prior to rendering the document for display, since they will be ignored as comments in the raster image processor that renders the document.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
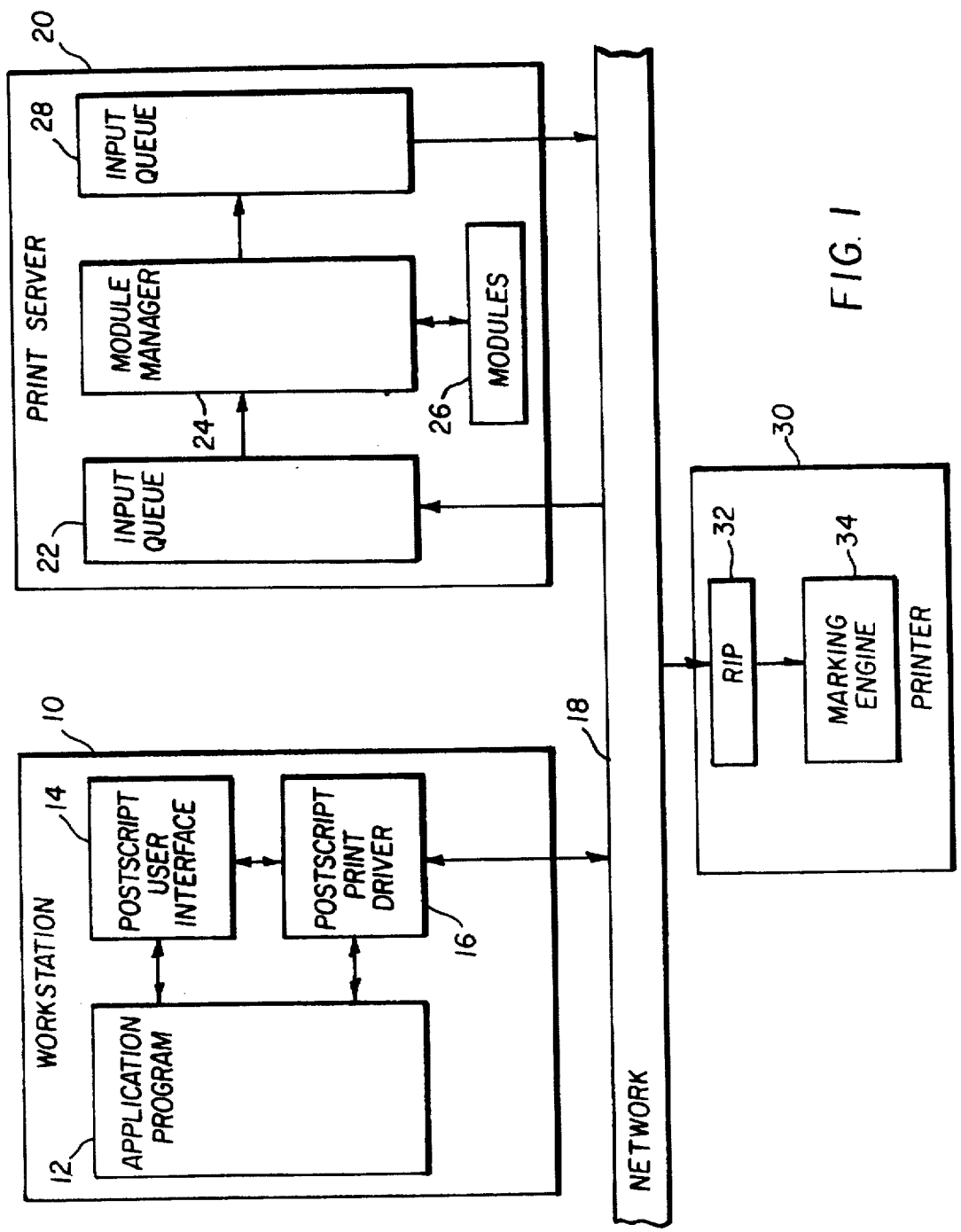
FIG. 1 is a block diagram illustrating a compound document processing system according to the present invention.

Beginning with FIG. 1 an exemplary compound document processing system according to the present invention is shown. A work station 10 such as a personal computer includes an application program 12 such as Microsoft Word, for producing compound documents having elements such as text and images. The work station 10 also includes a PostScript user interface 14 which allows the selection of print options such as color management, or proxy replacement. The PostScript user interface 14 is of the type that uses PostScript Printer Description (PPD) files to allow a user to specify options for the print job and a printer software developer to describe the options available for a particular printer. Tags described in the PPD file are inserted into the PostScript data file in response to the options chosen by the user. PPD files are human-readable machine-parseable text files that provide a uniform approach to using the diverse features of devices that contain PostScript interpreters. The information contained in PPD files serves as a list of available features, as a basis for building a user interface, and as a mechanism for invoking the features of a particular device. The present invention makes use of this ability to describe printer options and to modify the user interface as described below for practicing the present invention. A standard PostScript print driver 16, converts the compound document generated by the application program 12 into a PostScript data file. The PostScript user interface 14 directs the print driver 16 to insert tags representing the user selected options into the PostScript data file.

The workstation 10 is connected to a network 18 such as a local or wide area network, for communicating the Post- Script data file to a print server 20. The print server 20 includes a standard input queue 22 for stacking print jobs, a module manager 24 and a set of document processing modules 26 for performing compound document processing according to the present invention, and an additional output queue 28 for stacking processed print jobs.

A printer 30 is connected to the network 18 and receives print jobs from the print server 20. The printer 30 includes a standard raster image processor (RIP) 32 for converting the processed PostScript data files into rasterized bit map data for driving a marking engine 34.

Figure 2:
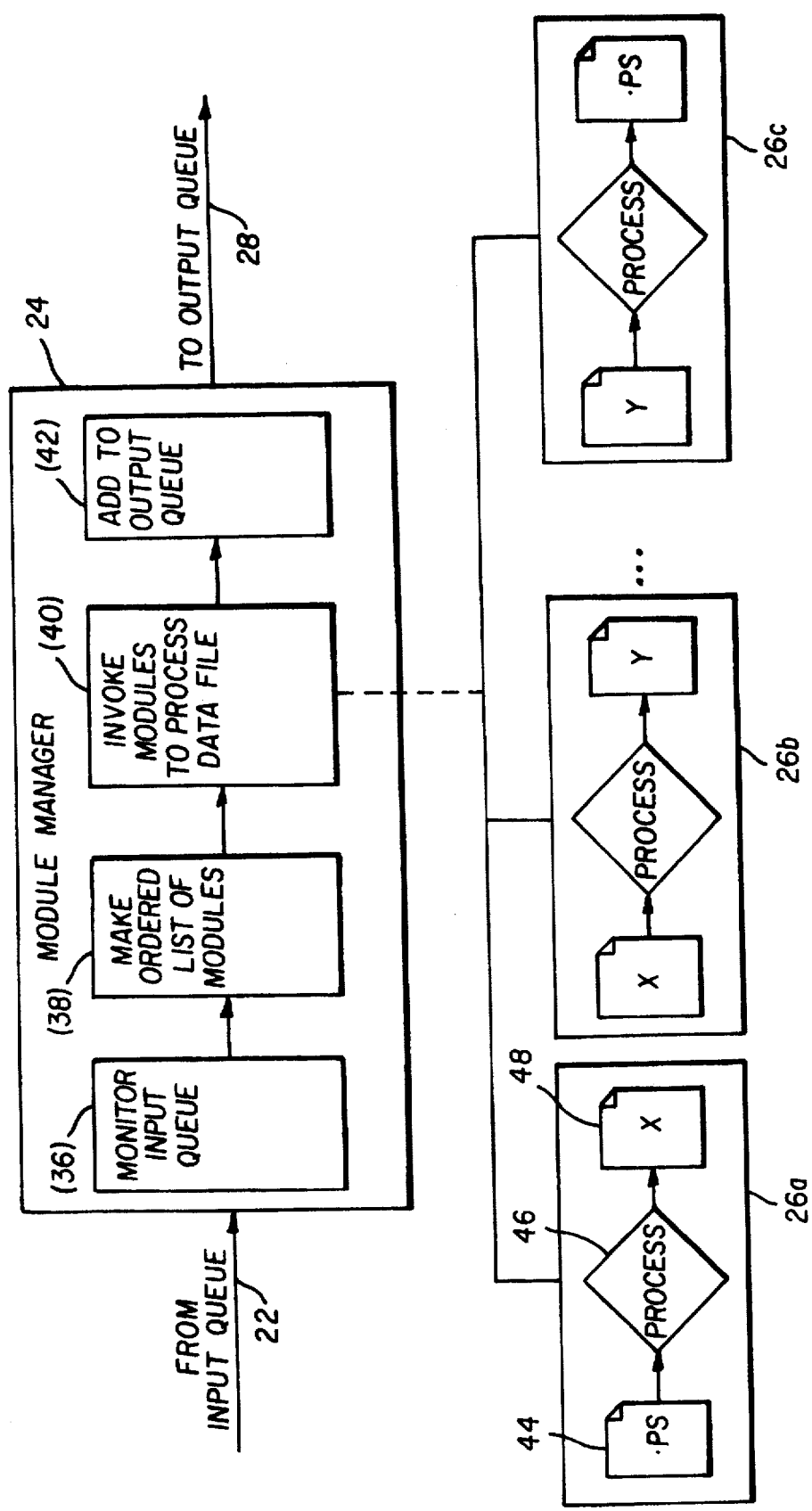
FIG. 2 is a block diagram showing the module manager and modules in greater detail.

The system of the present invention is designed to process a PostScript data stream before the stream is passed to an output device such as a printer or CRT. The system functions by sequentially scanning for specially defined tags that are disguised as PostScript comments and embedded in the PostScript data file. When a specially defined tag is located, the PostScript data file representing the compound document, or an element extracted therefrom is passed to a processing module indicated by the specially defined tag, where the module performs an indicated function on the compound document or the element. Referring now to FIG. 2, the module manager 24 and modules 26 will be described in further detail. The module manager 24 monitors the incoming print queue for new jobs (36); creates an ordered list of modules to invoke from the embedded tags in the PostScript data file (38); invokes the appropriate modules to process the PostScript data file (40); and sends (42) the processed PostScript data file to the output queue 28.

The modules 26 are stand-alone programs that manipulate the PostScript data files. They are invoked by the module manager in an order specified by the PostScript file. The "PostScript Printer Description File Format Specification" published by Adobe Developers Support describes the requirements for generating PPD files. The PPD specification discloses a method for controlling the order that commands (tags in the present case) are embedded into a PostScript data file. One requirement of the presently preferred embodiment is that regardless of any intermediate steps, a PostScript data file is taken as input and a PostScript data file is ultimately generated as output. As shown in FIG. 2, each module 26 receives a file 44, performs a process 46 on the file and produces a processed file 48. For the sake of example, the first module 26a receives a PostScript data file 44 indicated as .PS, and the last module 26c produces a PostScript data file 48 indicated as .PS. The other modules, e.g. module 26b, may receive any kind of file(s), and produce any kind of file(s), indicated by X's and Y's.

The specially defined tags employed in the present invention begin with a % sign (indicating a PostScript comment), followed by a keyword ("KIPPS" in the following example) that will be recognized by the module manager 24, followed by the name of the module to invoke, and finally followed by an optional list of parameters to be employed by the module. The specially defined tags are ignored by the PostScript Interpreter in the RIP 32, because the standard PostScript interpreter that is provided by the printer manufacturer is programmed to ignore comments in the PostScript data file. Because they are ignored in the RIP, the specially defined tags that are employed to process the PostScript data file prior to rendering in the RIP do not interfere with the standard operation of the RIP, thereby avoiding the need to remove the specially defined tags from the data file prior to rendering the compound document.

An example of the present invention called "KIPPS" for printing a PostScript data file to multiple color printers from multiple image sources, while automatically performing color management for the particular printer and image source was prepared as follows. The customizable print driver employed was LaserWriter 8.3fc2 from Adobe Systems.

Figure 3:
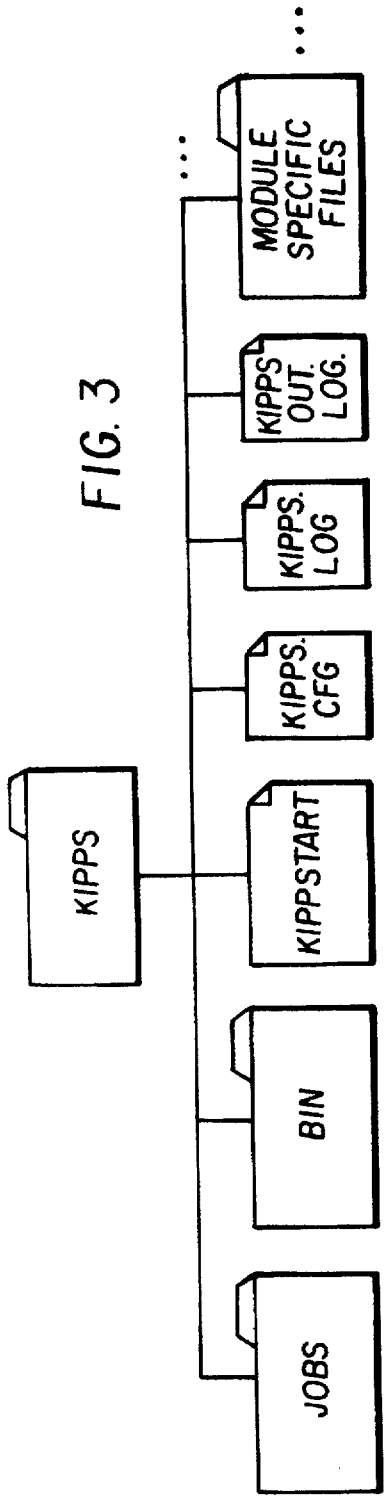
FIG. 3 is a screen print of the customizable print dialog box employed in the preferred embodiment of the present invention.
Figure 4:
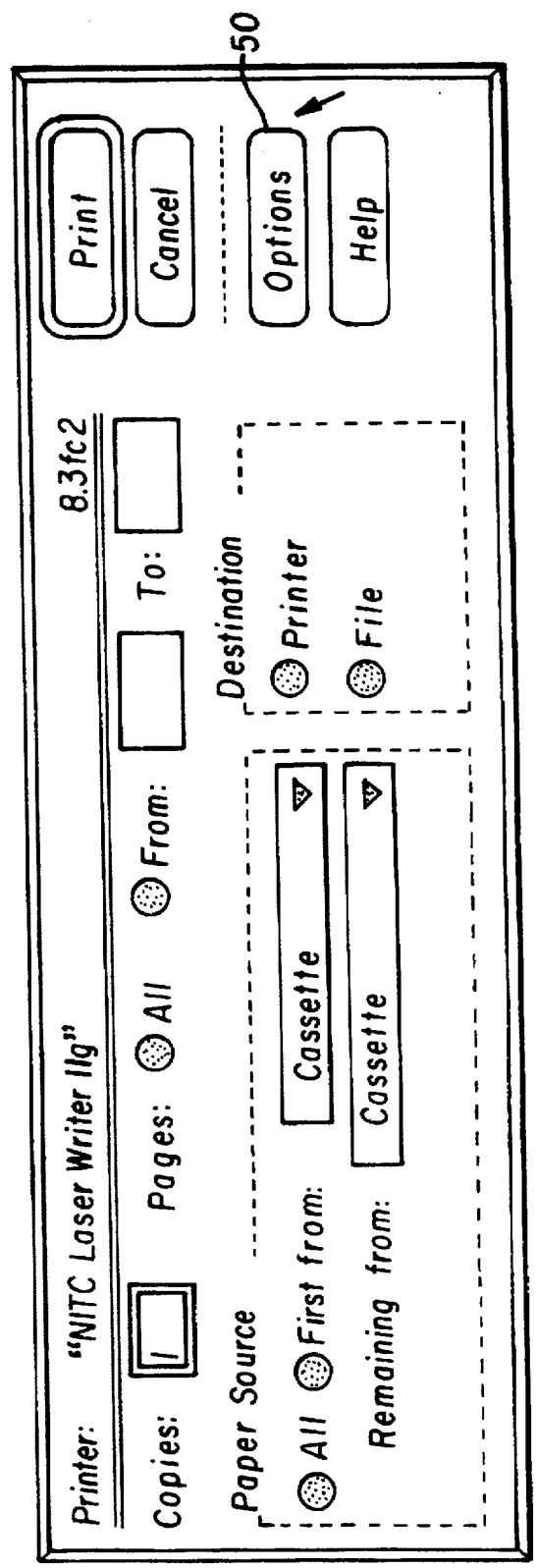
FIG. 4 is a screen print of the customizable print options dialog box employed in the preferred embodiment of the present invention.
Figure 5:
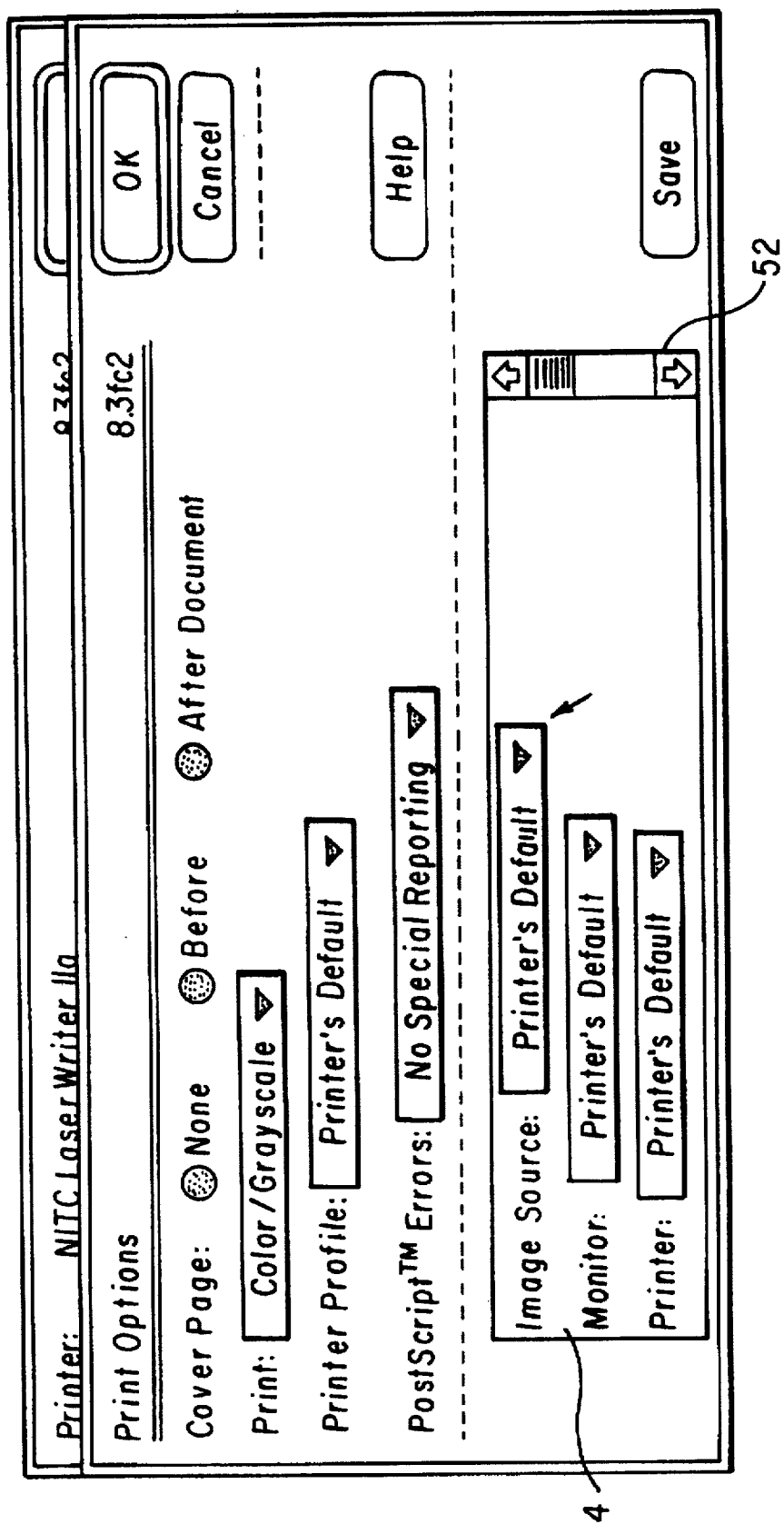
FIG. 5 is a schematic diagram illustrating the file structure of the module manager and the modules on the server.

FIG. 3 shows the customizable print dialog box for the print driver. In the present example, the print dialog box was not changed from the standard dialog box provided by the printer manufacturer. To invoke the capability of the present invention, the operator "clicks on" the Options button 50 in the print dialog box. In response, the print driver displays the customizable print options dialog box shown in FIG. 4. According to the present invention, the print options dialog box is customized to show the options for the modules 26 available on the print server 20. The options are displayed in scrolling list 52. The options dialog box was customized by adding appropriate commands to the PPD file that generates the options dialog box. A listing of the modified PPD for generating a dialog box of the form shown in FIG. 5 is included as Appendix A. The added commands are in a block identified as "KIPPS" in the listing.

The dialog box 52 displays, for example, the image source options 54 specified by the PPD. When the user selects one of the image source options, the PPD instructs the driver 16 to insert a corresponding specially defined tag into the PostScript data file. For example, if the user chooses the Kodak PhotoCD option, the driver 16 inserts the following two comments (specially defined tags) into the PostScript data:

%KIPPS: kcms new

%KIPPS: kcms in photocdr.inp

These tags instruct the module manager 24 to invoke a document processing module that performs color management appropriate for processing an image from a PhotoCD. Since the specially defined tags are disguised as PostScript comments, they will not interfere with the rendering of the compound document in the RIP 32. Similarly, the user may select a monitor, printer, or other options such as color management, or media type by scrolling the list 52, and corresponding specially defined tags will be inserted by the driver 16.

In the present example, the module manager 24 always first invokes a module for extracting digital images from the PostScript data. This is the module noted above that receives a PostScript file and that must be the first module in a series. A listing of an example of an "extract" module written in the C language is contained in Appendix B. Next, the module manager 24 invokes any module(s) called for by the embedded tag(s). A listing of an example of the module for invoking the color management function noted above written in the C language is contained in Appendix C. This module modifies the digital images that were extracted by the first module. Finally, the module manger 24 invokes a module for inserting the modified digital images back into the PostScript data. A listing of an example of an "insert" module written in the C language is contained in Appendix D. This is the module noted above that outputs a PostScript data file and must be the last module in a series for this embodiment.

Referring to FIG. 5, the file structure of the KIPPS print server 20 is shown. The jobs in the input queue 22 are contained in a directory called "jobs". The module manager program and all of the module programs are located in a directory called "bin". A file called "kippstart" is a script used to start up the system. A file called "kipps.cfg" contains general configuration information for the module manager.

A file called "kipps.log" and another filed called "kipps.out.log" contain a chronological history of system activity. Any module specific files may reside in additional directories. An example program for the module manager 24 written is the C language is included as Appendix E.

The invention has been described with reference to a preferred embodiment. However, it will be appreciated that variations and modifications can be effected by a person of ordinary skill in the art without departing from the scope of the invention. For example, although the invention has been described with reference to a document processing module for performing color management on color image elements in the compound document, modules for performing other functions such as: screening, image manipulation, preview before print, proxy image replacement, transmitting documents to remote printers, selective colorization, paper stock management, automatic printer resource management, PostScript file conversion, logo and forms merging into a document, watermarking, intelligent font substitution, and remote data base document element retrieval and merging are readily implemented using the method of the present invention.

PARTS LiST 10 workstation
12 application program
14 PostScript user interface
16 PostScript print driver
18 network
20 print server
22 input queue
24 module manager
26 document processing module(s)
28 output queue
30 printer
32 raster image processor
34 marking engine
36 monitor input queue step
38 make ordered list of modules step
40 invoke module to process data file step
42 add to output queue step
44 PostScript data file
46 module process
48 processed file
50 options button
52 scrolling list of options
54 image source options

I claim:

1. A compound document processing system, comprising:
    a) a print driver for generating a data file having commands and comments describing the compound document;
    b) a user interface including means for embedding document manipulation commands in the comments generated by the print driver;
    c) a document processing module for manipulating the data file; and
    d) a module manager responsive to the document manipulation commands embedded in the comments for causing the document processing module to manipulate the data file.

2. A method of processing a compound document, comprising the steps of:
    a) generating a data file including commands and comments describing a compound document;
    b) embedding document manipulation commands in comments in the data file; and
    c) manipulating the data file in response to the document manipulation commands embedded in the comments.

3. A compound document processing system, comprising:
    a) a PostScript print driver for generating a data file of PostScript commands and comments describing a compound document having elements;
    b) a Postscript user interface including means for embedding document manipulation commands in the PostScript comments generated by the PostScript print driver;
    c) a document processing module for manipulating the data file; and
    d) a module manager responsive to the document manipulation commands embedded in the PostScript comments for causing the document processing module to manipulate the data file.

4. The compound document processing system claimed in claim 3, wherein the document processing module performs color management on a color image in the compound document.

5. The compound document processing system claimed in claim 3, wherein the document processing module performs screening.

6. The compound document processing system claimed in claim 3, wherein the document processing module performs image manipulation.

7. The compound document processing system claimed in claim 3, wherein the document processing module performs preview before print.

8. The compound document processing system claimed in claim 3, wherein the document processing module performs proxy image replacement.

9. The compound document processing system claimed in claim 3, wherein the document processing module performs transmitting documents to remote printers.

10. The compound document processing system claimed in claim 3, wherein the document processing module performs selective colorization.

11. The compound document processing system claimed in claim 3, wherein the document processing module performs paper stock management.

12. The compound document processing system claimed in claim 3, wherein the document processing module performs automatic printer resource management.

13. The compound document processing system claimed in claim 3, wherein the document processing module performs PostScript file conversion.

14. The compound document processing system claimed in claim 3, wherein the document processing module performs logo and forms merging into a document.

15. The compound document processing system claimed in claim 3, wherein the document processing module performs watermarking.

16. The compound document processing system claimed in claim 3, wherein the document processing module performs intelligent font substitution.

17. The compound document processing system claimed in claim 3, wherein the document processing module performs remote data base document element retrieval and merging.

18. A computer program product for generating a compound document, comprising a computer readable storage medium having a computer program stored thereon for providing:
   a) a print driver for generating a data file having commands and comments describing the compound document;
   b) a user interface including means for embedding document manipulation commands in the comments generated by the print driver;
   c) a document processing module for manipulating the data file; and
   d) a module manager responsive to the document manipulation commands embedded in the comments for causing the document processing module to manipulate the data file.

19. A computer program product for generating a compound document, comprising a computer readable storage medium having a computer program stored thereon for performing the following steps when used by a computer:
   a) generating a data file including commands and comments describing a compound document;
   b) embedding document manipulation commands in comments in the data file; and
   c) manipulating the data file in response to the document manipulation commands embedded in the comments.

20. A computer program product for generating a compound document, comprising a computer readable storage medium having a computer program stored thereon for providing:
   a) a PostScript print driver for generating a data file of PostScript commands and comments describing a compound document having elements;
   b) a Postscript user interface including means for embedding document manipulation commands in the PostScript comments generated by the PostScript print driver;
   c) a document processing module for manipulating the data file; and
   d) a module manager responsive to the document manipulation commands embedded in the PostScript comments for causing the document processing module to manipulate the data file.

21. The computer program product claimed in claim 20, wherein the document processing module performs color management on a color image in the compound document.

22. The computer program product claimed in claim 20, wherein the document processing module performs screening.

23. The computer program product claimed in claim 20, wherein the document processing module performs image manipulation.

24. The computer program product claimed in claim 20, wherein the document processing module performs preview before print.

25. The computer program product claimed in claim 20, wherein the document processing module performs proxy image replacement.

26. The computer program product claimed in claim 20, wherein the document processing module performs transmitting documents to remote printers.

27. The computer program product claimed in claim 20, wherein the document processing module performs selective colorization.

28. The computer program product claimed in claim 20, wherein the document processing module performs paper stock management.

29. The computer program product claimed in claim 20, wherein the document processing module performs automatic printer resource management.

30. The computer program product claimed in claim 20, wherein the document processing module performs PostScript file conversion.

31. The computer program product claimed in claim 20, wherein the document processing module performs logo and forms merging into a document.

32. The computer program product claimed in claim 20, wherein the document processing module performs watermarking.

33. The computer program product claimed in claim 20, wherein the document processing module performs intelligent font substitution.

34. The computer program product claimed in claim 20, wherein the document processing module performs remote data base document element retrieval and merging.

* * * * *